United States Patent [19]

Owens

[11] Patent Number: 4,809,997

[45] Date of Patent: Mar. 7, 1989

[54] MOBILE STANDING AID

[76] Inventor: Jesse Owens, 679 Second St., Palmer, Ak. 99645

[21] Appl. No.: 181,411

[22] Filed: Apr. 14, 1988

[51] Int. Cl.⁴ .................... B60M 1/14

[52] U.S. Cl. .................... 280/211; 280/250

[58] Field of Search .................... 280/211, 250, 242 WC, 280/249, 242 R; 270/DIG. 10, DIG. 4, 464, 487, 488; 180/907

[56] References Cited

U.S. PATENT DOCUMENTS

| | | | |
|---|---|---|---|
| 2,506,860 | 5/1950 | Dimon | 280/250 X |
| 2,578,828 | 12/1951 | Nelson | 280/266 |
| 2,989,139 | 6/1961 | Pantek et al. | 182/15 |
| 3,107,105 | 10/1963 | Heriford | 280/211 |
| 3,249,368 | 5/1966 | Ginzburg | 280/219 |
| 3,493,245 | 2/1970 | Nabinger | 280/250 |
| 4,524,988 | 6/1985 | Netznik | 280/208 |
| 4,620,714 | 11/1986 | Davis | 280/242 R |
| 4,685,693 | 8/1987 | Vadjunec | 280/242 WC |

*Primary Examiner*—John A. Pakar
*Attorney, Agent, or Firm*—James Creighton Wray

[57] ABSTRACT

The mobile standing air has a rectangular base with two main wheels near the rearward portion of the base and two main caster wheels mounted on upward, forward and outward extensions near the front of the frame. Two rearward extensions mount smaller caster wheels to prevent rearward tipping. The standing aid has four members which extend vertically from the base. Horizontal pieces between the members form side and front walls which extend upward to an upper high area of a user. The rear of the machine is closed with a pivoted butt pad support which clamps a user in the machine along with forward relatively large thigh pads, a smaller horizontal lower knee pad and a horizontal heel or Achilles pad at the rear. Side pads are positioned adjacent the heel pad and halfway up the side portions at the knee area of a user. The effect of the pads is to firmly splint legs in place. Hand wheels on opposite sides drive sprockets and chains and pinions attached inside the main wheels. A chest pad on an upper ratchet extension permits forward bending. A hinged table lies flat against the front in a vertical position and raises to an elevated horizontal position. The back opening allows unassisted movement to and from a wheelchair using reasonable upper arm strength.

15 Claims, 1 Drawing Sheet

MOBILE STANDING AID

BACKGROUND OF THE INVENTION

Persons having little or no muscular control of the legs usually have to operate from a seated position, for example, either in a chair, a wheelchair, or a motor vehicle equipped with hand controls.

Standing up and operating while standing and being mobile while standing are goals which are important to anyone having little or no muscular control of legs.

It is highly desirable to have a standing aid which is capable of movement from room to room through doorways of conventional width and within rooms in aisles and spaces of conventional width.

It is important to have a lightweight standing aid which is capable of preventing tipping in any direction.

It is highly desirable to provide a standing aid which allows ease of entry and exit and rapid entry and exit with minimal securing requirements. It is highly desirable to have a device with as low as possible center of gravity with high chest support for a user.

It is highly desirable to have a device which may provide a working platform at high level which is easily raised and lowered and which is stabilized when in operating position.

It is highly desirable to have a device which is easily adjustable into fixed positions for use by different persons and which is easily adjustable to different operating conditions and positions.

The desired features of a mobile standing aid are not available in devices of the prior art. Consequently, a need exists for a device which supplies all of the desirable features of a mobile standing aid.

SUMMARY OF THE INVENTION

The present invention fulfills the outstanding requirements of the prior art by providing a device which has a compact nature and which fits in doorways, aisles and spaces normally encountered between and in rooms, which is rigid in construction, which is difficult to tip in any direction, which provides easy ingress and egress, which is easily adjustable to a user, which provides easy, unstressed chest support at selectable desired positions, and which provides a working desk at a convenient midchest height.

The mobile standing aid has a rectangular base with two main wheels near the rearward portion of the base and two main caster wheels mounted on upward, forward and outward extensions near the front of the frame. Two rearward extensions mount smaller caster wheels to prevent rearward tipping. The standing aid has four members which extend vertically from the base. Horizontal pieces between the members form side and front walls which extend upward to an upper thigh area of a user. The rear of the machine is closed with a pivoted butt pad support which clamps a user in the machine along with forward relatively large thigh pads, a smaller horizontal lower knee pad and a horizontal heel or Achilles pad at the rear. Side pads are positioned adjacent the heel pad and halfway up the side portions at the knee area of a user. The effect of the pads is to firmly splint legs in place. Hand wheels on opposite sides drive sprockets and chains and pinions attached inside the main wheels. A chest pad on an upper ratchet extension permits forward bending. A hinged table lies flat against the front in a vertical position and raises to an elevated horizontal position. The back opening allows unassisted movement to and from a wheelchair using reasonable upper arm strength.

A preferred mobile standing aid has a base, a pair of rear traction wheels rotatably connected to the base, two vertical rear frame members extending upward from the base near the traction wheel mounts, and two front upright frame members extending vertically upward from the base forward of the traction wheel mounts. An I-shaped frame member has an upper horizontal member connected between upper portions of the front frame members, has a lower horizontal member connected between portions of the front frame members at slightly below knee level of an occupant and has a central vertical member interconnecting the upper horizontal member and the lower horizontal member. The frame has upper side members connected between upper ends of adjacent front and rear vertical frame members and intermediate side members connected between adjacent front and rear vertical frame members at positions slightly above the lower horizontal member. A horizontal crosspiece is connected between the rear vertical frame members slightly above the base near rears of ankles of a user. An upper horizontal crosspiece has one end hinged to one rear vertical frame member and has a second end connectable to the other rear frame member near upper ends of the rear frame members for opening to allow ingress and egress of a user and closing to support the buttocks of a user. A frontal hinge is connected to the upper horizontal member and to the vertical member of the I-shaped member. An upright vertical support member is connected to the hinge and extends upward therefrom to a chest area of a user. The upright member is fixed in one of plural selected positions. Upward, forward and outward caster supports are positioned at frontal extremities of the base member. Caster wheels are connected to outer extremities of the caster wheel supports. Rearward extending arms connected to the base and extending rearward therefrom and small caster wheels connected to rearward extremities of the rearward extending arms support the mobile standing aid against rearward tipping. First and second hand wheels are connected laterally to frame members, and flexible drive means interconnect each hand wheel with a traction wheel. A platform is connected to the base for supporting a user, platform cushion covers an upper surface of the base. An ankle cushion extends above a rear of the base cushion and extends forward along sides of the base cushion. Preferably, the ankle cushion is mounted on the lower crosspiece. A frontal knee cushion is mounted on a side of the lower horizontal member facing rearward. First and second lateral knee cushions are mounted on inside surfaces of the intermediate side members. Upper leg supports and upper leg cushions are mounted on insides of the upper horizontal member and the vertical member. A chest support and cushion is connected to the chest an upper end of the upright support member. Preferably, the ankle supports, buttocks supports, and chest supports are adjustably connected to their supporting members so that the device may be adjusted to particular individuals. In a preferred embodiment, first and second desk support arms have proximal ends, pivoted on sides of upper portions of the front frame members. Distal ends of the desk support arms are pivoted on forward portions of side edges of a desk. A desk support is connected medially to the vertical support member, and a rearward portion of the desk is connected to the desk support.

These and further and other objects and features of the invention are apparent in the disclosure which includes the specification with the above and ongoing description and claims and the drawings.

DETAILED DESCRIPTION OF THE DRAWINGS

Figure 1:
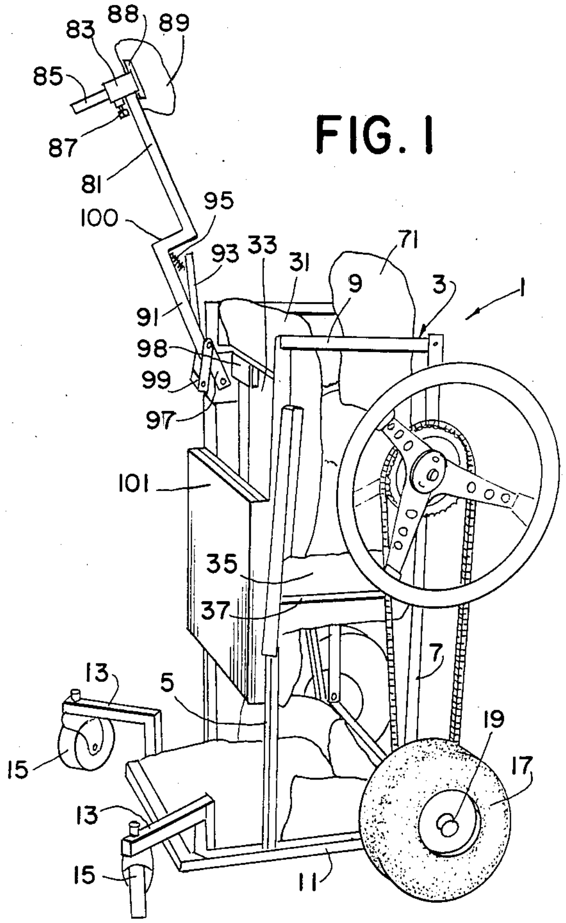
FIG. 1 is a perspective view of the mobile standing aid.
Figure 2:
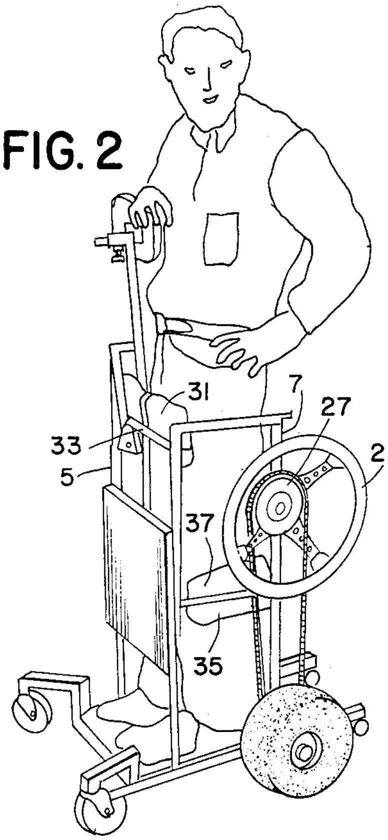
FIG. 2 is a perspective view of the mobile standing aid showing a user standing in the machine.
Figure 3:
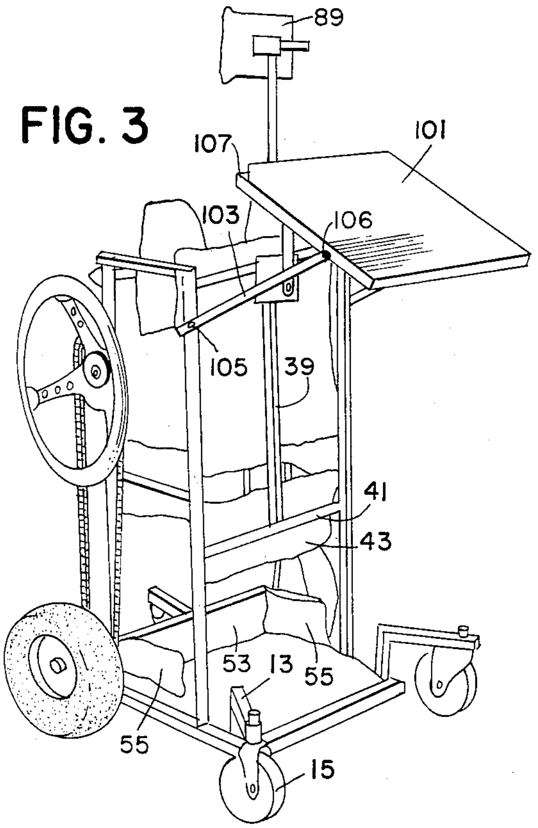
FIG. 3 is a perspective view of the mobile standing aid showing a desk partially raised.
Figure 4:
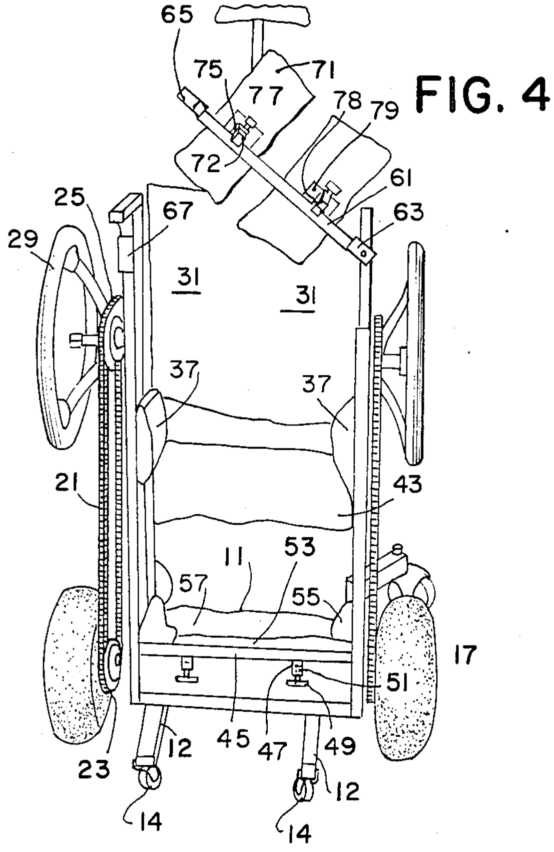
FIG. 4 is a perspective view of the mobile standing aid showing a partially raised upper crosspiece, which allows easy ingress and egress.

A mobile standing aid is generally indicated by the numeral 1.

The standing aid is made of a generally rectangular frame 3, which has parallel front vertical members 5 and parallel rear vertical members 7, which are joined together by upper side members 9.

A base 11 supports the frame. The base 11 has upward and outward extending caster wheel supports 13 mounted near a front extremity of the base. Caster wheels 15 are supported in outer extremities of the caster wheel supports 13. Rearward extending arms 12 extend rearward from base 11. Small caster wheels 14 at the outer ends of arms 12 prevent rearward tipping of the mobile standing aid 1.

Traction wheels 17 are mounted on rotary mounts or axles 19, which are connected to the base 11 or to the base 11 via lower portions of the rear vertical members 7. Roller-type drive chains 21 connect pinions 23 on the traction wheels 17 with sprockets 25, which are supported on rotary mounts 27 and are connected to hand wheels 29. The rotary mounts 27 are connected to upper portions of the rear vertical support members. Turning the hand wheels forward propels the mobile standing aid forward, and turning the wheels 29 rearward propels the mobile standing aid rearward. Turning one of the wheels or turning both wheels in opposite directions turns the mobile standing aid. Upper leg supports and cushions 31 are connected to upper horizontal member 33, which extends between upper portions of the front vertical members 5. Intermediate side members 35 hold lateral knee supports and cushions 37. A vertical member 39 is connected between upper horizontal member 33 and lower horizontal member 41. Together, the three members form an I-shaped frame member, which stabilizes the frame. Frontal knee support and cushion 43 is connected to lower horizontal member 41. A rear lower crosspiece 45 extends between rear vertical members 7. Rectangular pieces 47 are welded beneath the rear lower crosspiece 45 and adjustment screws 49 cooperate with the rectangular pieces 47 to fix horizontal bars 51 in one of plural positions. The front end of horizontal bars 51 are connected to ankle support and cushion 53. Lateral ankle supports and cushions 55 are connected rectangularly to cushion 53 and are movable forwardly and rearwardly along the base, as controlled by the adjustment means 47, 49 and 51. A base cushion 57 is fixed to a user's supporting platform on base 11.

Upper crosspiece 61 is hinged 63 at one end to an upper portion of a rear vertical member 7. The other end 65 of crosspiece 61 is received within a locking receiver 67 on the other vertical rear member 7.

Buttocks supports and cushions 71 are connected to plates 79, which are connected to the front ends of rods 72. Rods 72 extend through openings 78 in rectangular pieces 75, which are welded to the top of upper crosspiece 61. Screws 77 clamp the rods 72 in desired positions.

Upright support 81 has a rectangular tube 83 at its upper end through which bar 85 moves into one of several positions held by bolt 87. Bar 85 supports on its forward end plate 88, which holds the chest support and cushion 89. The lower portion 91 of the upright support 81 is pivoted 97 to a block 98, which is secured on the upper horizontal member and the vertical member 39. A lever 93 is pivoted 94 on the lower portion. A spring 95 pulls lever 93 forward, drawing bar 99 into one of the detent notches cut in the face of block 98 and preventing motion of support 81 around the pivot 97.

A desk 101 normally lays along the front of the frame. When the desk 101 is raised, parallel desk support arms 103 and the ledge portion 100, support the desk in its horizontal position.

Support arms 103 are pivoted 105 at proximal ends to upper portions of front vertical members 5. Distal ends of the support arms 103 are pivoted 106 on lateral edges of a desk frame 107. The rear surface of desk 101 is supported on ledge 100 when the upright support member 81 is raised to its vertical position. A latch on ledge 100 holds the desk in position until it is intentionally lowered.

When getting into the mobile support frame, one raises the upper crosspiece 61 so that it rests outwardly against a hand wheel 29, providing open access to the rear of the frame 3. The upright support member 81 is moved to its forwardmost position 81, where it is held in place by lever 93, spring 95 and detent bar 99.

The device may be drawn directly up to a chair with the arms 12 extending under the chair and legs or wheels of a chair abutting the rear of frame 11 or the traction wheels 17. Feet are placed on cushion 57 with heels against heel support and cushion 53 and, pulling forward and upward, the knees are brought to bear against knee support and cushion 43, and then the upper legs are brought to bear against upper leg support and cushion 31.

The upper crosspiece 61 is then pivoted downward so that end 65 rests in receiver 67. A person is then anchored within the mobile standing aid and is ready to operate from a standing position. Lever 93 is pulled, disengaging detent bar 99 from detent notches in block 98 and the upright support 81 is positioned in the desired position for resting a person's chest against the chest support and cushion 89, while using his hands to raise the desk 101, to control the drive wheels 29, or to perform other functions.

Before leaving the mobile standing aid, lever 93 is pulled to release the detent bar 99 from the forward facing detents in block 98. The free end 65 of upper crosspiece 61 is disengaged from receiver 67 and the crosspiece is lifted, opening the back of the device to permit rearward egress, such as into a fixed or wheeled chair or into a seat of a vehicle. The mobile standing aid is hand-operated, contains no motorized parts, and can be mounted from a standard wheelchair without aid of others. It is designed for indoor use or on flat, level surfaces. Access through doors and around a house is about the same as for a wheelchair. Overall dimensions of a preferred embodiment are approximately 24 inches wide, 36 inches long, and 35 inches high. The mobile standing aid can be adjusted to varied sized individuals.

The gear ratio between the drive sprocket and the pinion can be adjusted to the strength of the user and the type of usual surface, such as carpets, on which the vehicle moves.

Pads may be adjusted in vertical positions by loosening mounting bolts and sliding the supports and pads upward or downward.

While the invention has been described with reference to specific embodiments, modifications and variations can be manufactured without departing from the scope of the invention, which is defined in the following claims.

I claim:

1. A mobile standing aid comprising a base, a pair of traction wheel mounts connected to the base, a pair of rear traction wheels rotatably connected to the mounts, a frame connected to the base, two vertical rear frame members extending upward from the base near the traction wheel mounts, two front upright frame members extending vertically upward from the base forward of the traction wheel mounts, an I-shaped frame member having an upper horizontal member connected between upper portions of the front frame members and having a lower horizontal member connected between portions of the front frame members at slightly below knee level of a user and having a central vertical member interconnecting the upper horizontal member and the lower horizontal member, the frame having upper side members connected between upper ends of adjacent front and rear vertical frame members and intermediate side members connected between adjacent front and rear vertical frame members at positions slightly above the lower horizontal member, and further comprising a horizontal crosspiece connected between the rear vertical frame members slightly above the base near rear of ankles of a user, and an upper horizontal crosspiece having one end hinged to one rear vertical frame member and having a second end connectable to the other rear frame member near upper ends of the rear frame members for opening to allow ingress and egress of a user and for closing to support the buttocks of a user, a frontal hinge connected to the upper horizontal member and to the vertical member of the I-shaped frame member, an upright vertical support member connected to the hinge and extending upward therefrom to a chest area of a user and means for fixing the upright member in one of plural selected positions, and further comprising upward, forward and outward caster wheel supports positioned at frontal extremities of the base and caster wheels connected to outer extremities of the caster wheel supports, rearward extending arms connected to the base and extending rearward therefrom and small caster wheels connected to rearward extremities of the rearward extending arms for supporting the mobile standing aid against rearward tipping, a platform connected to the base for supporting a user, platform cushion means for covering an upper surface of the platform, ankle support and cushion means extending along a rear of the platform cushion means and extending forward therefrom along sides of the base cushion means and means for mounting the ankle cushion means on the lower crosspiece, knee support and cushion means for mounting on a side of the lower horizontal member facing rearward and means for connecting the knee support and cushion means to the lower horizontal member, first and second lateral knee support and cushion means for mounting on inside surfaces of the intermediate side members and means for connecting the lateral knee support and cushion means to the intermediate side members, upper leg support means for mounting inside of the upper horizontal member and the vertical member, and upper leg cushion means for connecting to the upper leg support means, and means for connecting the upper leg support means and the upper leg cushion means to the upper horizontal member and to the vertical member, buttocks support means for connection to the upper crosspiece and buttocks cushion means for connecting to the buttocks support means and means for connecting the buttocks support means and cushion means to the upper crosspiece, chest support means for connection to an upper end of the vertical support member and chest cushion means connected to the chest support means and means for mounting the chest support means and the chest cushion means on an upper end of the vertical support member, the chest support mounting means comprising adjustable means for fixing the chest support in one of plural positions in relation to an upper end of the vertical support member, a desk, first and second desk support arms having proximal and distal ends, first and second pivot means for connecting proximal ends of the first and second support arms to upper portions of the front frame members and third and fourth pivot means connected to distal ends of the support arms, the desk having a front edge, a rear edge, and side edges, forward portions of the side edges being connected to the third and fourth pivot means, desk support means connected to the vertical support member and a rearward portion of the desk platform being connected to the desk support means, first and second hand wheels connected laterally to frame members and flexible drive means interconnecting each hand wheel with a traction wheel.

2. A mobile standing aid comprising a base, traction wheels rotatably connected to the base, two rear frame members extending upward from the base near the traction wheels, two front frame members extending upward from the base forward of the traction wheels, an I-shaped frame member having an upper horizontal member connected between upper portions of the front frame members and having a lower horizontal member connected between portions of the front frame members and having a central vertical member interconnecting the upper horizontal member and the lower horizontal member, upper side members connected between upper ends of adjacent front and rear vertical frame members and intermediate side members connected between intermediate portions of the adjacent front and rear vertical frame members, and further comprising a lower horizontal crosspiece connected between the rear vertical frame members slightly above the base, and an upper horizontal crosspiece having one end hinged to one rear vertical frame member and having a second end connectable to the other rear frame member near upper ends of the rear frame members for opening to allow ingress and egress of a user and closing to support the buttocks of a user.

3. The mobile standing aid of claim 2 further comprising, a frontal hinge connected to the upper horizontal member and to the vertical member of the I-shaped frame member, an upright vertical support connected to the hinge and extending upward therefrom and means for fixing the upright member in position.

4. The mobile standing aid of claim 2 further comprising upward and forward and outward extending caster supports positioned at frontal extremities of the base and caster wheels connected to outer extremities of the caster supports.

5. The mobile standing aid of claim 2 further comprising rearward extending arms connected to the base and extending rearward therefrom and small caster wheels connected to rearward extremities of the rearward extending arms for supporting the mobile standing aid against rearward tipping.

6. The mobile standing aid of claim 2 further comprising a platform connected to the base for supporting a user, platform cushion means covering an upper surface of the base, ankle cushion means extending along a rear of the base cushion means and extending forward therefrom along sides of the base cushion means and means for mounting the ankle cushion means on the lower crosspiece, knee cushion means for mounting on a side of the lower horizontal member facing rearward and means for connecting the knee cushion means to the lower horizontal member, first and second lateral knee cushion means for mounting on inside surfaces of the intermediate side members and means for connecting the lateral knee cushion means to the intermediate side members, upper leg support means for mounting inside of the upper horizontal member and the vertical member, and upper leg cushion means for connecting to the upper leg support means, and means for connecting the upper leg support means and the upper leg cushion means to the upper horizontal member and the vertical member, and buttocks support means for connecting to the upper crosspiece and buttocks cushion means for connecting to the buttocks support means and means for connecting the buttocks support means to the upper crosspiece.

7. The mobile standing aid of claim 2 further comprising chest support means for connection to an upper end of the vertical support and chest cushion means connected to the chest support means and means for mounting the chest support means and the chest cushion means on an upper end of the upright support member, the chest support mounting means comprising adjustable means for fixing the chest support in one of plural positions in relation to an upper end of the upright support.

8. The mobile standing aid of claim 2 further comprising a desk means, first and second desk support arms having proximal and distal ends, first and second pivot means for connecting proximal ends of the first and second support arms to upper portions of the front frame members and third and fourth pivot means connected to distal ends of the support arms, a desk platform having a front edge, a rear edge, and side edges, forward portions of the side edges being connected to the third and fourth pivot means, desk support means connected to the upright support and a rearward portion of the desk platform being connected to the desk support means.

9. The mobile standing aid of claim 2 further comprising first and second hand wheels connected laterally to frame members and flexible drive means interconnecting a hand wheel with a traction wheel.

10. A mobile standing aid comprising a base, a pair of rear traction wheels rotatably connected to the base, two rear frame members extending upward from the base near the traction wheels, two front upright frame members extending vertically upward from the base forward of the traction wheels, an I-shaped frame member having an upper horizontal member connected between upper portions of the front frame members and having a lower horizontal member connected between portions of the front frame members at slightly below knee level of a user and having a central vertical member interconnecting the upper horizontal member and the lower horizontal member, upper side members connected between upper ends of adjacent front and rear vertical frame members and intermediate side members connected between adjacent front and rear vertical frame members at positions slightly above the lower horizontal member and further comprising a lower horizontal crosspiece connected between the rear vertical frame members slightly above the base near a rear of ankles of a user, and an upper horizontal crosspiece having one end hinged to one rear vertical frame member and having a second end connectable to the other rear frame member near upper ends of the rear frame members for opening to allow ingress and egress of a user and closing to support the buttocks of a user, a frontal hinge connected to the upper horizontal member and to the vertical member of the I member, an upright support member connected to the hinge and extending upward therefrom to a chest area of a user and means for fixing the upright support member in one of plural selected positions, and further comprising upward and forward and outward caster supports positioned at frontal extremities of the base and caster wheels connected to outer extremities of the caster wheel supports, rearward extending arms connected to the base and extending rearward therefrom and small caster wheels connected to rearward extremities of the rearward extending arms for supporting the mobile standing aid against rearward tipping, and first and second hand wheels connected laterally to frame members and flexible drive means interconnecting each hand wheel with a traction wheel.

11. The mobile standing aid of claim 10 further comprising a base cushion covering an upper surface of the base, an ankle cushion extending along the lower crosspiece and extending forward therefrom along sides of the base cushion, a frontal knee cushion mounted on an inside of the lower horizontal member, first and second lateral knee cushions mounted on inside surfaces of the intermediate side members, and an upper leg cushion connected to an inside of the upper horizontal member and the vertical member, buttocks cushions connected to an inside of the upper crosspiece, and a chest cushion connected to an upper end of the upright support member.

12. The mobile standing aid of claim 11 further comprising adjustable chest support means connected between the chest cushion and the upper end of the upright support member for fixing the cushion in one of plural positions in relation to an upper end of the vertical support member.

13. The mobile standing aid of claim 11 further comprising ankle support adjustment means connected between the lower crosspiece and the ankle cushion for adjusting position of the ankle cushion and the lower crosspiece.

14. The mobile standing aid of claim 11 further comprising buttocks support adjustment means connected between the upper crosspiece and the buttocks cushions for adjusting position of the cushions with respect to the upper crosspiece.

15. The mobile standing aid of claim 10 further comprising first and second desk support arms having proximal and distal ends, first and second pivots for laterally connecting proximal ends of the first and second support arms to upper portions of the front frame members and third and fourth pivots connected to distal ends of the support arms, a desk having a front edge, a rear edge, and side edges, forward portions of the side edges being connected to the third and fourth pivots, the upright support member having a medial inward extending ledge, and a rearward portion of the desk platform being supported on the ledge.

* * * * *